United States Patent Office 2,924,535
Patented Feb. 9, 1960

2,924,535

METHOD OF DEPOSITING A SILVER FILM

Vincent J. Schaefer, Schenectady, N.Y., assignor to General Electric Company, a corporation of New York No Drawing. Application December 6, 1954
Serial No. 473,447

7 Claims. (Cl. 117—33.3)

This invention is concerned with polymeric bodies containing metals or metallic compositions in particulate form. More particularly, this invention relates to metallic particles or compounds embedded in polymeric materials and to the process of preparing same. Still more particularly, this invention relates to products produced by a method in which metallic compositions are reduced by an oxidizable polymeric material, resulting in particles of said metallic compositions being embedded in said polymeric body.

Briefly stated, the present invention has as one of its principal aspects the use of a polymeric material which performs the dual function of reducing agent and supporting medium for the reduced metallic particles, thus eliminating the need for, the inconvenience of, and the contaminating effect of auxiliary reducing agents.

I have discovered that, upon heating, it is possible to precipitate particles of metals and metallic compounds from solutions of the corresponding metallic compositions and polyvinyl alcohol, polyvinyl alcohol derivatives, or copolymers thereof in the absence of a reducing agent other than polyvinyl alcohol. The preferred metallic compositions are those which contain an element from group Ib or group VIII of the periodic table.

Polyvinyl alcohol solutions of many kinds may be used. The solubility and viscosity of aqueous polyvinyl alcohol solutions depend on the molecular weight and degree of hydrolysis of polyvinyl acetate used as source material. The term "polyvinyl alcohol" as commonly used designates substantially unesterified polyvinyl alcohols as well as the products of the partial alcoholysis or hydrolysis of polyvinyl esters. Monomeric vinyl alcohol does not exist as such but rearranges to the more stable configuration of acetaldehyde. Therefore, it is necessary to first prepare polyvinyl alcohol esters and then convert these compounds to polyvinyl alcohols by hydrolysis or alcoholysis. The solubility of these completely or partially hydrolyzed products depends on the degree of saponification and the solvents or mixtures of solvents used. The most common solvents are water and mixtures of lower alcohols and water, although other organic solvents, such as dimethyl formamide, may be used.

Nearly all of the desirable methods for preparing polyvinyl alcohol described in the patent literature include a procedure for the deacetylation of polymeric vinyl acetate using acidic or basic catalysts in an alcoholic medium. These methods and the resulting products are described in U.S. Patents 1,672,156, 2,109,883 and 2,227,997.

Polyvinyl alcohols of a wide range of molecular weights may be used. As is well known, polyvinyl alcohols can be made in different degrees of polymerization, the degree of polymerization depending upon the extent of polymerization of the parent ester from which the alcohol is derived and the degree of degradation occurring during saponification. The formula of polyvinyl alcohol is —(CH$_2$—CHOR)$_n$—, where R is selected from the group consisting of hydrogen and an acyloxy radical and $n$ equals a number from 20 to 2,000 or more. This range may be subdivided into compounds having various molecular weights: (1) low molecular weights where $n$ equals 20–50, (2) medium molecular weights where $n$ equals 50–500, and (3) high molecular weights where $n$ equals 500–2,000 or more. Since this is an arbitrary classification, there is no sharp line of division between the various groups. The water solubility increases when R represents hydrogen rather than an acyloxy radical.

Most of these modifications in polyvinyl alcohols are to some degree soluble in water. Generally, the more highly polymerized forms are less readily soluble and produce solutions of higher viscosities for equal concentrations than lower polymers. The following are trade names of various polyvinyl alcohols: Gelvatol (Shawinigan), Elvanol (Du Pont), Polyco 118 (American Polymer), Polyviol (Wacker), Vinarol (German), etc. Commercial solutions of polyvinyl alcohols are usually identified by code numbers, such as Elvanol 51–05. The first number (51) indicates the degree of hydrolysis while the second number (05) indicates the approximate viscosity in centipoises of a 4% solution in water at 20° C.

These polymeric materials also encompass partial derivatives, such as hemiacetals, hemiketals, ketals, or acetals. These compounds are produced by the reaction of polyvinyl alcohols with ketones or aldehydes. The properties of the resulting products vary with the proportion of hydroxy groups substituted by acetal or ketal linkages. When the hydroxy groups predominate, the resulting product is more readily water soluble. As greater substitution of the alcoholic group occurs, the polymer becomes more organically soluble.

Various copolymers of vinyl alcohol may also be used, such as hydrolyzed and partially hydrolyzed products of polyvinyl esters which have been copolymerized with certain unsaturated compounds. Some monomers that copolymerize with vinyl esters are maleic anhydride, ethylene, maleic and fumaric esters, methacrylic esters, styrene, methacrylonitrile, vinylidene chloride, acrylonitrile, acrylic esters, vinyl chloride, allyl chloride, vinyl and allyl acetates, isopropenyl acetates, etc. Thus, the term "polyvinyl alcohol" as employed in this invention encompasses a polyvinyl alcohol containing free hydroxyl groups whether it be copolymeric with other monomers, or whether some of its hydroxy groups have been converted to functional derivatives.

The metallic compositions encompassed within this invention are those which contain an element from group Ib or group VIII of the Periodic Table and are generally present, prior to heating, as cations. Examples of these cations are $Cu^{2+}$, $Cu^+$, $Ag^+$, $Fe^{3+}$, $Fe^{2+}$, etc. Solutions of these starting metallic compositions are comparatively stable and therefore do not need to be prepared immediately prior to reaction. In general, they are comparatively mild oxidizing agents and do not unduly degrade the polyvinyl alcohol so as to deleteriously affect the tensile strength of the final product. From these groups I prefer to use silver, copper and iron compositions, salts of these elements such as the chlorides, sulfates, nitrates, etc., being preferred.

In contrast to the preferred metallic compositions are compositions containing an element of groups VIa and VIIa which in combination with oxygen are capable of forming highly oxidative anions, such as dichromates, manganates, permanganates, etc. These compositions are such strong oxidizing agents and have such a short thermal shelf life that they must be made up immediately prior to use. Upon heating, these compositions unduly degrade the polyvinyl polymers so that their tensile strength is diminished. Therefore, compositions comprising these elements are not within the scope of this invention.

Metallic compositions comprising the combination of elements of group Ib and group VIII as well as the elements of groups VIa and VIIa are also to be avoided since the anions of the latter groups contained therein are stronger oxidizing agents than those elements of groups Ib and VIII. An example of these is cupric dichromate ($CuCr_2O_7$) which is unstable on standing. In fact, if cupric dichromate is heated mildly, even in the absence of the polymer, it decomposes to a brown insoluble product which is not cupric dichromate.

The concentration of metallic compositions and polyvinyl alcohol compounds present in the unreduced composition will depend upon desired properties, solubility of reactants in the solvents employed, etc. For ease of handling, these metallic compositions are either in solution or in a small enough size so that interfacial reduction is possible. The amount present in the final compositions is also determined by physical and chemical factors, such as tendency to coagulate or precipitate the dissolved polymer, stoichiometry in relation to oxidizable —OH groups, etc., as well as economic considerations. Thus, it can be seen that a wide range of compositions may be used. Another factor limiting concentration is that viscosity may present a handling problem. Thus, the amounts that one may use are subject to wide variance, depending on the application. In the case of water solutions, I can use concentrations of polyvinyl alcohol up to 20%, based on total weight of solution. As for metallic compositions, in general, I can operate up to 15% and preferably 1–10%, based on total weight of solution. Of course, the tolerance of polyvinyl alcohol solutions for metallic compositions will vary with the specific polymer as well as the metallic constituent. For example, as shown by DuPont's trade booklet "Elvanol" (A–5408–10M–12–47), page 29, a solution of "Elvanol" 74–24 will tolerate 15% $CuSO_4$ before polyvinyl alcohol precipitates from solution.

Although the preferred solvent medium is one in which both the reducible metallic composition and the polymeric material are soluble, a suspension of these materials may be used. Since water will dissolve or suspend many metallic compositions as well as polyvinyl polymers, functional derivatives and copolymers possessing sufficient untreated hydroxy groups, it is the preferred solvent. As greater hydroxyl substitution occurs, the polymers become more water insoluble and mixtures of water and organic solvents, such as mixtures of ethanol-water, dioxane-water, etc., can be used to effect solubility.

Emulsions and dispersions of polyvinyl alcohols of limited solubility can also be used. For example, partially hydrolyzed polyvinyl acetate of limited water solubility can be emulsified in an aqueous medium with emulsifying agents such as soaps, quaternary amines, etc. which are not themselves readily reduced.

In molding, an auxiliary solvent or dispersing medium need not be used. For example, the finely ground polyvinyl alcohol molding powder can be intimately mixed with the metallic composition and placed in the mold. As the polymer melts, a liquid medium is formed in which the reduction takes place. The heat supplied to the mold reduces the metallic composition present.

The mechanism of the reaction is not completely understood. It does not take place at lower temperatures. Temperatures above 75° C. are necessary to effect the reduction of the metallic compositions at a practical rate. The upper temperature limit is below the decomposition temperature of the polymeric material which may vary with the constituents present. Although polyvinyl alcohol begins to undergo thermal decomposition at about 200° C., short exposures at this temperature are possible. I have prepared these compositions with short exposures at 200° C. A range of 100° to 150° C. is preferred.

The metal-containing polymeric bodies may be of any desired shape or thickness. They may be in the form of large bodies, films, tape or filaments, independently supported or supported on auxiliary surfaces, such as glass, quartz, or plastic.

This system is especially useful for the precipitation of magnetically susceptible composition from precursors containing elements in group VIII of the periodic table. For example, when iron compositions are altered through the reducing action of polyvinyl alcohol, particles of permanent magnetic materials are efficiently produced and embedded in the polymer. After a section of iron-containing polymer produced by my process had been touched with one pole of bar magnet, it immediately reversed its position upon being touched by the opposite pole. This is indicative of permanent magnetism. Thus, magnetic tapes can be prepared from polymer solutions containing reducible metallic compositions.

Another use for polymeric bodies containing metallic compositions is the preparation of metal-containing fibers as magnetic materials of high coercive force. Since polyvinyl alcohol can be prepared as synthetic fibers of very small diameter, iron, or other reducible metal compositions which possess magnetic properties, can be incorporated therein and permanently magnetized. This can be done in the following manner: Polyvinyl alcohol containing therein a metallic composition, capable of magnetism upon subsequent chemical reduction, can be spun into a fiber. After spinning and solvent removal, the fibers are heated to obtain magnetic properties. This process may be benefited by: (1) a magnetic field, (2) an electric field, (3) physical treatment, such as tension and compression. In this manner, particles of permanent magnetic materials can be embedded in polymeric filaments. These embodiments are of particular value to the electrical industry for recording, for magnetic memory units, for digital computers, etc.

Silver precipitated in a similar manner also exhibits unusual properties. When silver is precipitated by this process, a bright permanent silver mirror is formed within the film. These silver mirrors are not easily tarnished.

Due to partial transparency the silver deposits of this invention can be used as band-pass or selective filters in the range of 2400–4000 angstrom units in the ultraviolet range with a peak transmission of 55% at about 3250 angstrom units. Multiple layers of these films are effective as band-pass filters within the visible range. These transmission measurements were prepared by reducing silver compositions in a polymeric material so as to form a film on transparent materials, such as a quartz disk.

Chemically, these silver films have been converted to silver halides. For example, it was possible to convert the film to silver iodide by exposing it to iodine vapor.

Electrically, precipitated silver, or other conducting metals or metallic compounds, can be used as painted or printed circuits by casting or printing solutions of reducible metallic compositions and polyvinyl alcohol, drying in a suitable manner and heating to produce the conducting constituent.

The conductivity of these films appears to depend upon the amount of heating and chemical reduction. For example, it is possible to have a highly reflecting silver film with very low electrical conductivity which is rendered more conductive by further heat treatment. Thus, deposits of various reflectivities and electrical conductivities may be obtained.

These products are tough, coherent, organic, self-supporting, boiling-water insoluble products which possess unusual magnetic, conducting, or light-reflecting properties. They can be made as self-containing objects, as films, as filaments, etc., or they can be supported on other bases. They can be used as mirrors, as permanent magnetics capable of unusual application due to their form, as light filters, as electrical printed or painted circuits, as a reflecting film in combination with a phosphor for television screens, etc.

A more complete understanding of the procedures of this invention may be had by reference to the following illustrative examples which are presented for illustration and not for purposes of limitation. All parts are by weight of total solution.

*Example 1*

Samples of 3% aqueous solutions of polyvinyl alcohol (Elvanol 51–05) containing from 1–5% ferric sulfate were cast on glass, dried, and heated. These films became shiny due to the reduction of ferric sulfate. Some of the film was scraped from the glass and was found to be highly magnetic.

*Example 2*

A sample of a 5% aqueous solution of polyvinyl alcohol (Elvanol 54–22) containing about 5% ferrous sulfate was cast on glass, dried and processed by heating. One was heated in a reducing atmosphere of burning hydrocarbon gas, the second was heated in air. Both residues contained particles which were strongly magnetic.

The above examples were repeated using ferrous sulfate, ferrous chloride, and ferric chloride.

The films produced in the above examples were permanent magnets. This is illustrated by the following experiment: a flake of the product prepared in the manner of Example 2 was touched with one end of a bar magnet. When the other pole was brought near the flake, it reversed its position in the manner of a permanent magnet.

*Example 3*

A sample of a 3% aqueous solution of polyvinyl alcohol (Elvanol 51–05) containing 2% $AgNO_3$ was painted on a piece of copper, dried, and heated in the reducing atmosphere of burning hydrocarbon gases in air. A high reflecting coating of bright silver mirror formed within the film.

In a subsequent experiment a bright silver mirror was prepared by casting the above solution on glass, drying and heating at 200° C. for a short period.

When several successive layers of the above solution were cast and dried, very bright and vivid colors were transmitted and reflected, thus producing a combination reflecting and transmitting pattern.

The above $AgNO_3$-polyvinyl alcohol solution was cast on a quartz disk and its transmission measured. This film is a band-pass filter in the range of 2400–4000 angstrom units in the ultraviolet range with a peak transmission of 55% at about 3250 angstrom units.

Polymeric methyl methacrylate was also coated with a silver film by this method, illustrative of the fact that polymeric substrates may be used as bases for these compositions.

The foregoing detailed description has been given for clearness of understanding only and no unnecessary limitations are to be understood therefrom. This invention is not limited to the exact details shown and described for obvious modifications will occur to those skilled in the art.

What I claim as new and desire to secure by Letters Patent of the United States is:

1. A process of preparing a metallic silver, mirror-like coating on a selected area of the surface of a solid which comprises coating said area with an aqueous solution containing polyvinyl alcohol and a water soluble silver salt and heating the coated area to a temperature in the range of 75–200° C. until the silver coating is formed.

2. The process as in claim 1 whereby the heating is done in a reducing atmosphere produced by burning a hydrocarbon gas.

3. A process of preparing a silver mirror on a selected area of the surface of a solid which comprises coating said area with a mixture consisting of a polyvinyl alcohol, water and a water soluble silver salt reducible by said polyvinyl alcohol and heating the coated area to a temperature of 75–200° C. until the silver mirror is formed.

4. A process of preparing a silver mirror on a selected area of a solid which comprises coating said area with a mixture consisting essentially of a polyvinyl alcohol, water and silver nitrate and heating the coated area to a temperature of 75–200° C. until the silver mirror is formed.

5. A process of preparing a metallic silver, mirror-like coating on a selected area of the surface of a solid which comprises coating the said area with a solution consisting essentially of a polyvinyl alcohol, water and silver nitrate and heating the coated area to a temperature in the range of 75–200° C. until the silver coating is formed.

6. The method of making a band pass filter characterized by transmission in the 2400–4000 Angstrom unit range, which method comprises casting on a transparent base a solution consisting of a polyvinyl alcohol and silver nitrate in water and heating the resulting assembly at a temperature of from 75–200° C. to solidify the polyvinyl alcohol and reduce the silver in said silver nitrate to elemental silver.

7. The method of making a band pass filter characterized by transmission in the 2400–4000 Angstrom unit range, which method comprises casting a solution consisting of polyvinyl alcohol and silver nitrate in water on a quartz base and heating the resulting assembly at a temperature of from 75–200° C. to solidify the polyvinyl alcohol and reduce the silver in said silver nitrate to elemental silver.

References Cited in the file of this patent

UNITED STATES PATENTS

| | | |
|---|---|---|
| 2,111,272 | Paulson | Mar. 15, 1938 |
| 2,125,374 | Herrmann et al. | Aug. 2, 1938 |
| 2,311,058 | Lowe | Feb. 16, 1943 |
| 2,311,059 | Lowe | Feb. 16, 1943 |
| 2,395,616 | Dangelmajer | Feb. 26, 1946 |
| 2,417,885 | Powell et al. | Mar. 25, 1947 |

FOREIGN PATENTS

| | | |
|---|---|---|
| 807,042 | France | Oct. 5, 1936 |
| 123,054 | Australia | Dec. 9, 1946 |